(12) United States Patent
Yamada et al.

(10) Patent No.: US 12,279,026 B2
(45) Date of Patent: Apr. 15, 2025

(54) IMAGING DEVICE

(71) Applicant: Panasonic Intellectual Property Management Co., Ltd., Osaka (JP)

(72) Inventors: Kazuhiro Yamada, Osaka (JP); Yosuke Asai, Osaka (JP); Hiroshi Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 229 days.

(21) Appl. No.: 17/707,331

(22) Filed: Mar. 29, 2022

(65) Prior Publication Data

US 2022/0224845 A1     Jul. 14, 2022

Related U.S. Application Data

(63) Continuation of application No. PCT/JP2020/024787, filed on Jun. 24, 2020.

(30) Foreign Application Priority Data

Oct. 9, 2019 (JP) .................................. 2019-185627

(51) Int. Cl.
*G01N 21/3581* (2014.01)
*H04N 23/11* (2023.01)

(52) U.S. Cl.
CPC .......... *H04N 23/11* (2023.01); *G01N 21/3581* (2013.01)

(58) Field of Classification Search
None
See application file for complete search history.

(56) References Cited

U.S. PATENT DOCUMENTS

| | | | | |
|---|---|---|---|---|
| 5,047,783 | A * | 9/1991 | Hugenin | G01V 8/005 348/294 |
| 6,777,684 | B1 * | 8/2004 | Volkov | G01N 21/3581 343/915 |
| 6,965,340 | B1 * | 11/2005 | Baharav | H01Q 21/065 342/195 |
| 7,105,820 | B2 * | 9/2006 | Federici | G01S 17/89 250/339.02 |

(Continued)

FOREIGN PATENT DOCUMENTS

| | | |
|---|---|---|
| CN | 105675131 | 6/2016 |
| EP | 3363357 | 8/2018 |

(Continued)

OTHER PUBLICATIONS

Extended European Search Report issued Oct. 26, 2022 in corresponding European Patent Application No. 20873366.7.

(Continued)

*Primary Examiner* — Marcus H Taningco
*Assistant Examiner* — Djura Malevic
(74) *Attorney, Agent, or Firm* — Wenderoth, Lind & Ponack, L.L.P.

(57) ABSTRACT

An imaging device includes: a light source including an emission surface from which a sub-terahertz wave is emitted to a measurement target; and a detector including an image sensor that detects the intensity of a reflected wave generated by the measurement target reflecting the sub-terahertz wave emitted from the emission surface.

12 Claims, 11 Drawing Sheets

(56) References Cited

U.S. PATENT DOCUMENTS

| | | | | |
|---|---|---|---|---|
| 7,873,182 | B2* | 1/2011 | Andrew | H04N 5/272 |
| | | | | 348/262 |
| 8,169,355 | B2* | 5/2012 | Bartscher | G01S 13/90 |
| | | | | 342/25 R |
| 8,350,223 | B2* | 1/2013 | Mintz | G01J 1/08 |
| | | | | 250/252.1 |
| 8,497,477 | B1* | 7/2013 | Williams | G01S 13/887 |
| | | | | 250/336.1 |
| 8,531,674 | B2* | 9/2013 | Soga | G01N 21/3563 |
| | | | | 250/341.1 |
| 8,780,345 | B2* | 7/2014 | Furxhi | H01Q 15/0053 |
| | | | | 356/310 |
| 8,835,849 | B1* | 9/2014 | Williams | G01S 13/89 |
| | | | | 250/336.1 |
| 9,207,175 | B2* | 12/2015 | Yu | G01N 21/645 |
| 9,335,407 | B2* | 5/2016 | Bowring | G01S 7/412 |
| 9,568,593 | B2* | 2/2017 | Ahmed | G01S 13/89 |
| 10,009,098 | B2* | 6/2018 | Murakowski | H04B 7/08 |
| 10,310,072 | B2* | 6/2019 | Daisy | G01S 13/887 |
| 10,330,610 | B2* | 6/2019 | Charvat | G01N 22/00 |
| 10,332,089 | B1* | 6/2019 | Asmi | H04N 5/2628 |
| 10,713,912 | B2* | 7/2020 | Wagner | B66B 1/468 |
| 11,105,954 | B2* | 8/2021 | Kare | H01S 5/005 |
| 11,282,319 | B2* | 3/2022 | Hewitt | G07C 9/00571 |
| 11,297,255 | B1* | 4/2022 | Schiller | G01J 3/0289 |
| 11,333,789 | B2* | 5/2022 | Obata | G06V 40/10 |
| 11,467,088 | B2* | 10/2022 | Kim | G01N 15/1459 |
| 11,733,422 | B2* | 8/2023 | Zhao | G01V 5/0008 |
| | | | | 378/57 |
| 12,161,428 | B1* | 12/2024 | Lang | A61B 90/39 |
| 2005/0122258 | A1* | 6/2005 | Blasing | H01Q 21/0025 |
| | | | | 342/179 |
| 2007/0195921 | A1* | 8/2007 | Ouchi | G01N 22/00 |
| | | | | 378/1 |
| 2009/0195435 | A1* | 8/2009 | Kapilevich | G01S 7/032 |
| | | | | 342/202 |
| 2009/0242799 | A1* | 10/2009 | Bolotin | G01N 15/1463 |
| | | | | 356/335 |
| 2009/0294704 | A1* | 12/2009 | Zailer | H01Q 15/0073 |
| | | | | 250/580 |
| 2009/0296368 | A1* | 12/2009 | Ramer | F21V 14/003 |
| | | | | 362/84 |
| 2011/0036995 | A1* | 2/2011 | Binnie | G01N 21/6486 |
| | | | | 250/461.1 |
| 2012/0043476 | A1* | 2/2012 | Salmelainen | G01N 21/645 |
| | | | | 250/200 |
| 2012/0075477 | A1* | 3/2012 | Daly | H04N 5/33 |
| | | | | 348/E5.09 |
| 2012/0120385 | A1* | 5/2012 | Jiang | G01N 21/64 |
| | | | | 356/51 |
| 2012/0194376 | A1* | 8/2012 | Daly | G01S 13/887 |
| | | | | 342/22 |
| 2012/0273681 | A1* | 11/2012 | Schulkin | G01N 21/3586 |
| | | | | 250/339.06 |
| 2013/0015354 | A1* | 1/2013 | Diamond | G01N 21/4795 |
| | | | | 250/222.1 |
| 2013/0021613 | A1* | 1/2013 | Furxhi | G02B 26/10 |
| | | | | 359/234 |
| 2013/0277558 | A1* | 10/2013 | Yamamura | G01J 5/34 |
| | | | | 250/338.3 |
| 2013/0327929 | A1* | 12/2013 | Ohkubo | G01J 1/42 |
| | | | | 362/241 |
| 2015/0378449 | A1* | 12/2015 | Hine | H04N 9/3197 |
| | | | | 348/333.1 |
| 2017/0013284 | A1* | 1/2017 | Murakami | H04N 21/238 |
| 2018/0136335 | A1* | 5/2018 | Kare | G01S 17/04 |
| 2018/0192057 | A1* | 7/2018 | Ardo | H04N 19/114 |
| 2019/0117109 | A1* | 4/2019 | Grundfest | A61B 5/4875 |
| 2019/0120756 | A1* | 4/2019 | Moon | G01J 3/4535 |
| 2019/0128803 | A1* | 5/2019 | Ushida | G01N 21/19 |
| 2019/0259791 | A1* | 8/2019 | Itsuji | H01L 27/14605 |
| 2019/0293751 | A1* | 9/2019 | Kopeika | H04N 5/30 |
| 2021/0295592 | A1* | 9/2021 | von Cramon | G06N 3/08 |
| 2022/0224845 | A1* | 7/2022 | Yamada | H04N 23/11 |

FOREIGN PATENT DOCUMENTS

| | | |
|---|---|---|
| JP | 2005-305060 | 11/2005 |
| JP | 2007-218661 | 8/2007 |
| JP | 2015-195562 | 11/2015 |
| JP | 2017-9296 | 1/2017 |
| JP | 2018-110399 | 7/2018 |
| JP | 2019-526812 | 9/2019 |
| WO | 2017/175770 | 10/2017 |
| WO | 2018/015949 | 1/2018 |
| WO | 2018/097035 | 5/2018 |

OTHER PUBLICATIONS

International Search Report (ISR) issued on Sep. 8, 2020 in International (PCT) Application No. PCT/JP2020/024787.

* cited by examiner

IMAGING DEVICE

CROSS REFERENCE TO RELATED APPLICATIONS

This is a continuation application of PCT International Application No. PCT/JP2020/024787 filed on Jun. 24, 2020, designating the United States of America, which is based on and claims priority of Japanese Patent Application No. 2019-185627 filed on Oct. 9, 2019. The entire disclosures of the above-identified applications, including the specifications, drawings and claims are incorporated herein by reference in their entirety.

FIELD

The present invention relates to imaging devices.

BACKGROUND

Conventionally, an imaging device which images an object that is hidden under people's clothes or the like and cannot be visually identified directly is known (see PTL 1, for example).

CITATION LIST

Patent Literature

PTL 1: U.S. Pat. No. 8,835,849

SUMMARY

Technical Problem

Conventionally, an imaging device that (i) includes: a point light source that emits electromagnetic waves that transmit through people's clothes or the like to a person; and a detector that receives reflected waves of the electromagnetic waves emitted from the point light source, and (ii) images an object hidden under the person's clothes or the like is known. In the use of such a conventional imaging device, electromagnetic waves that transmit through people's clothes or the like are specularly reflected by a human body, a metal, or the like. The conventional imaging device can therefore image only an area, of a human body, a metal, or the like that specularly reflects the electromagnetic waves emitted from the point light source, which is defined by an angle at which the reflected waves are incident on the detector. Accordingly, with the conventional imaging device, it is difficult to image, with high accuracy, the shape of a human body, a metal, or the like that is hidden under people's clothes or the like and cannot be visually identified directly.

In view of this, the present invention provides an imaging device capable of imaging more accurately, than the conventional imaging device, the shape of an object that is hidden under people's clothes or the like and cannot be visually identified directly.

Solution to Problem

An imaging device according to an aspect of the present disclosure includes: a first light source including a first emission surface from which a sub-terahertz wave is emitted to a measurement target; and a first detector including a first image sensor that detects an intensity of a reflected wave generated by the measurement target reflecting the sub-terahertz wave emitted from the first emission surface. Note that the term "sub-terahertz wave" refers to an electromagnetic wave having a frequency that ranges from 0.08 THz to 1 THz, inclusive.

Advantageous Effects

With the imaging device according to an aspect of the present disclosure, it is possible to image more accurately, than a conventional imaging device, the shape of an object that is hidden under people's clothes or the like and cannot be visually identified directly.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS (How the Inventors Conceived an Aspect of the Present Disclosure)

The inventors have conducted a dedicated study on an imaging device which can perform imaging that enables detection of a hazardous object (e.g., a knife or the like) hidden, for instance, under people's clothes or the like, or in a bag.

Hereinafter, the study conducted by the inventors will be described.

The inventors have studied on the relationship between attenuation and frequency when electromagnetic waves transmit through a matter used as a material for clothes, bags, or the like.

Figure 1:
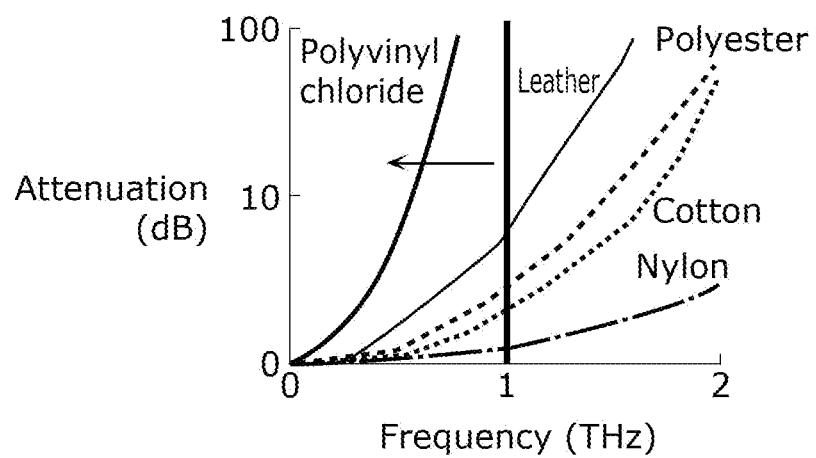
FIG. 1 is a diagram illustrating the relationship between attenuation and frequency when electromagnetic waves transmit through a matter.

FIG. 1 is a diagram illustrating the relationship between attenuation and frequency when electromagnetic waves transmit through a matter.

As illustrated in FIG. 1, electromagnetic waves having a frequency of at most 1 THz can transmit through many of matters used as materials for clothes, bags, or the like.

As a result of the study, the inventors have obtained the knowledge that it is appropriate to utilize electromagnetic waves having a frequency of at most 1 THz in order to detect a hazardous object hidden, for instance, under people's clothes or in a bag.

The inventors have also studied on a frequency that achieves resolution with which the shape of a hazardous object can be imaged.

The relationship between the frequency (wavelength) of electromagnetic waves and resolution is expressed by Equation 1 known as Abbe's formula.

[Math. 1]

$$\delta = \frac{\lambda}{2NA} = \frac{\lambda}{2n\sin\theta} \qquad \text{Equation 1}$$

In Equation 1, δ denotes resolution, λ denotes the wavelength of electromagnetic waves, NA denotes the number of apertures of a lens, n denotes the refractive index of a medium between an object and the lens, and θ denotes a maximum angle with respect to the optical axis of a light beam incident on the lens from the object. When approximation is performed assuming d»D where D denotes the entrance pupil diameter of an imaging lens and d denotes the distance from the entrance pupil position of the imaging lens to the object, Equation 2 is yielded.

[Math. 2]

$$\delta = \frac{\lambda}{n} * \frac{\sqrt{D^2 + d^2}}{D} \sim \frac{\lambda d}{nD} \qquad \text{Equation 2}$$

Figure 2:
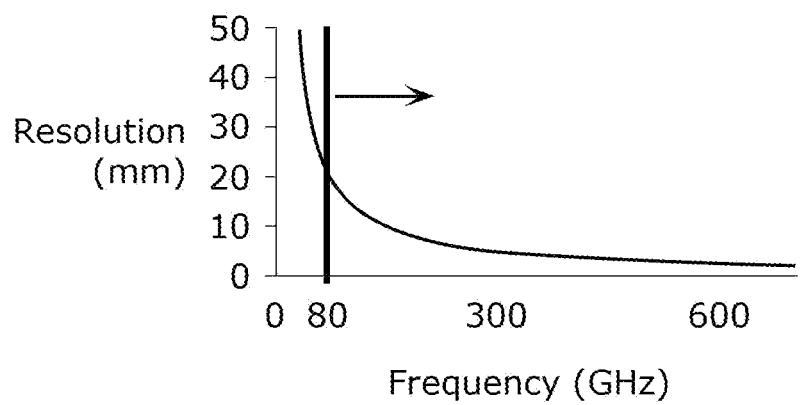
FIG. 2 is a diagram illustrating the relationship between the frequency of electromagnetic waves and resolution.

FIG. 2 is a diagram illustrating a graph into which Equation 2 is transformed under the conditions of D=0.5 m and d=2.5 m where n=1 assuming an air environment.

As illustrated in FIG. 2, it is possible to image the shape of a hazardous object such as a knife by utilizing electromagnetic waves having the frequency of at least 80 GHz (0.08 THz).

As a result of the study, the inventors have obtained knowledge that it is appropriate to utilize electromagnetic waves having the frequency of at least 0.08 THz in order to image the shape of a hazardous object such as a knife.

In other words, through these studies, the inventors have obtained knowledge that it is appropriate to utilize sub-terahertz waves that are electromagnetic waves having a frequency that ranges from 0.08 THz to 1 THz, inclusive, in order to perform imaging that enables the detection of a hazardous object hidden, for instance, under people's clothes or the like, or in a bag.

It is known that sub-terahertz waves do not affect human bodies. Therefore, utilizing sub-terahertz waves as electromagnetic waves to be emitted to a human body does not cause any problems in terms of safety.

On the other hand, sub-terahertz waves specularly reflect off a human body, a metal, or the like. Therefore, in imaging utilizing electromagnetic waves (sub-terahertz waves in this case) emitted from a point light source, it is difficult to image, with high accuracy, the shape of a human body, or a metallic hazardous object such as a knife, as has conventionally been the case. In order to solve this problem, the inventors have studied on the shape of a light source that emits sub-terahertz waves. As a result, the inventors have obtained the knowledge that if a light source that emits sub-terahertz waves is an area light source, it is possible to irradiate an object to be imaged with sub-terahertz waves from various angles, thereby enabling more accurate imaging, than that performed by a conventional imaging device, of the shape of an object such as a human body, a metal, or the like which specularly reflects sub-terahertz waves.

Based on all of the knowledge described above, the inventors have arrived at the following imaging device.

An imaging device according to an aspect of the present disclosure includes: a first light source including a first emission surface from which a sub-terahertz wave is emitted to a measurement target; and a first detector including a first image sensor that detects an intensity of a reflected wave generated by the measurement target reflecting the sub-terahertz wave emitted from the first emission surface.

The imaging device performs imaging utilizing sub-terahertz waves emitted from the first light source which is an area light source.

With the imaging device, it is possible to image more accurately, than a conventional imaging device, the shape of an object such as a human body, a metal, or the like which is hidden under people's clothes or the like and cannot be visually identified directly.

The first light source may include: at least one point light source that emits a sub-terahertz wave; and an optical element that generates, from the sub-terahertz wave emitted from the at least one point light source, a sub-terahertz wave to be emitted from the first emission surface.

The optical element may include a reflector that diffusely reflects the sub-terahertz wave emitted from the at least one point light source, to generate a sub-terahertz wave to be emitted from the first emission surface.

The optical element may include a diffuser that diffusely transmits the sub-terahertz wave emitted from the at least one point light source, to generate a sub-terahertz wave to be emitted from the first emission surface.

The first emission surface may be a curved surface.

The curved surface may include part of an inner surface of a spheroid.

The spheroid may be a sphere.

The first emission surface may include part of an inner surface of a spheroid. The first light source may include: a point light source that emits a sub-terahertz wave; and an optical element that generates, from the sub-terahertz wave emitted from the point light source, a sub-terahertz wave to be emitted from the first emission surface. The first light source may be disposed at one of two focal points of the spheroid.

The imaging device may further include: a second light source including a second emission surface from which a sub-terahertz wave is emitted to the measurement target; and a second detector including a second image sensor that detects an intensity of a reflected wave generated by the measurement target reflecting the sub-terahertz wave emitted from the second emission surface.

The first image sensor may output a first image that is based on the intensity of the sub-terahertz wave detected. The second image sensor may output a second image that is based on the intensity of the sub-terahertz wave detected. The imaging device may further include: an image processing unit which blends the first image and the second image in a lighten only mode to generate a blended image, and outputs the blended image generated.

The image processing unit may determine whether at least one of the first image or the second image includes an object having a predetermined characteristic. When it is determined that the at least one of the first image or the second image includes an object having the predetermined characteristic, the image processing unit may output a predetermined first detection signal. When it is determined that the at least one of the first image or the second image does not include an object having the predetermined characteristic, the image processing unit may generate the blended image and further determine whether the blended image includes an object having the predetermined characteristic. When it is determined that the blended image includes an object having the predetermined characteristic, the image processing unit may output a predetermined second detection signal.

The sub-terahertz wave may be an electromagnetic wave having a frequency that ranges from 0.08 THz to 1 THz, inclusive.

Hereinafter, specific examples of an imaging device according to an aspect of the present disclosure will be described with reference to the drawings. Each of embodiments described herein illustrates a specific example of the present disclosure. Note that the numerical values, shapes, elements, the arrangement and connection of elements, steps (processes), an order of the steps, etc. described in the following embodiments are mere examples, and do not intend to limit the present disclosure. Moreover, the figures are schematic diagrams and are not necessarily accurate illustrations. Hereinafter, the term "planar surface" refers not only to a surface that is accurately planar, but also to a surface that is substantially planar. In addition, the term "spheroid" refers not only to a surface that is accurately a spheroid, but also to a surface that is substantially a spheroid.

It should be noted that general or specific aspects of the present disclosure may be implemented using a system, method, integrated circuit, computer program, computer-readable recording medium such as a CD-ROM, or any combination of systems, methods, integrated circuits, computer programs, or computer-readable recoding media.

Embodiment 1

The following describes an imaging device that emits sub-terahertz waves to a person, receives reflected waves generated by the person reflecting the sub-terahertz waves, and detects the intensity of the received reflected waves, to image a hazardous object such as a knife hidden by that person under his/her clothes or the like.

Figure 3:
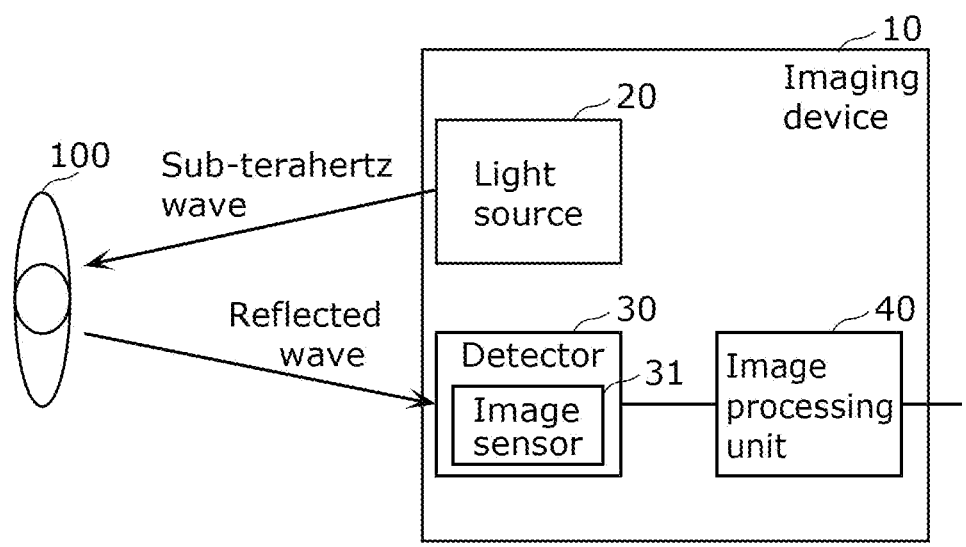
FIG. 3 is a block diagram illustrating a configuration of an imaging device according to Embodiment 1.

FIG. 3 is a block diagram illustrating a configuration of imaging device 10 according to Embodiment 1.

As illustrated in FIG. 3, imaging device 10 includes light source 20, detector 30, and image processing unit 40.

Light source 20 emits sub-terahertz waves to a measurement target (person 100 in this case).

Figure 4:
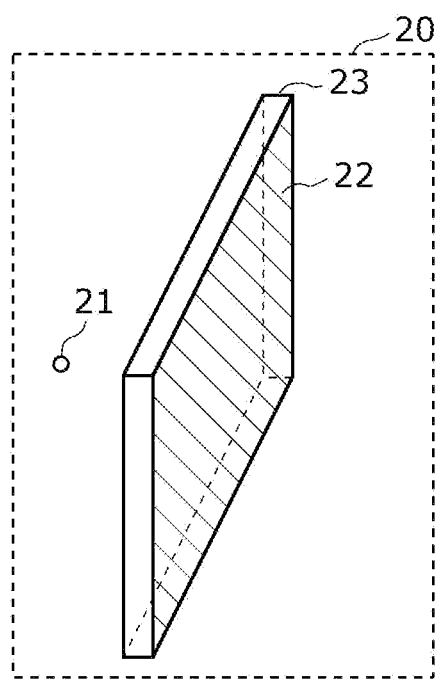
FIG. 4 is a schematic diagram illustrating a configuration of a light source according to Embodiment 1.

FIG. 4 is a schematic diagram illustrating a configuration of light source 20.

As illustrated in FIG. 4, light source 20 includes point light source 21 and optical element 23.

Point light source 21 emits sub-terahertz waves radially in all directions in the vicinity of point light source 21.

Optical element 23 has emission surface 22 and generates, from the sub-terahertz waves emitted from point light source 21, sub-terahertz waves to be emitted from emission surface 22. Emission surface 22 here is a planar surface. Therefore, optical element 23 functions as an area light source that emits sub-terahertz waves from emission surface 22 which is a planar surface. The emission surface from which sub-terahertz waves are emitted is a planar surface for the sake of explanation, but may be the inner surface of a spheroid to be described later, the inner surface of part of a sphere, or any curved surface.

Figure 5:
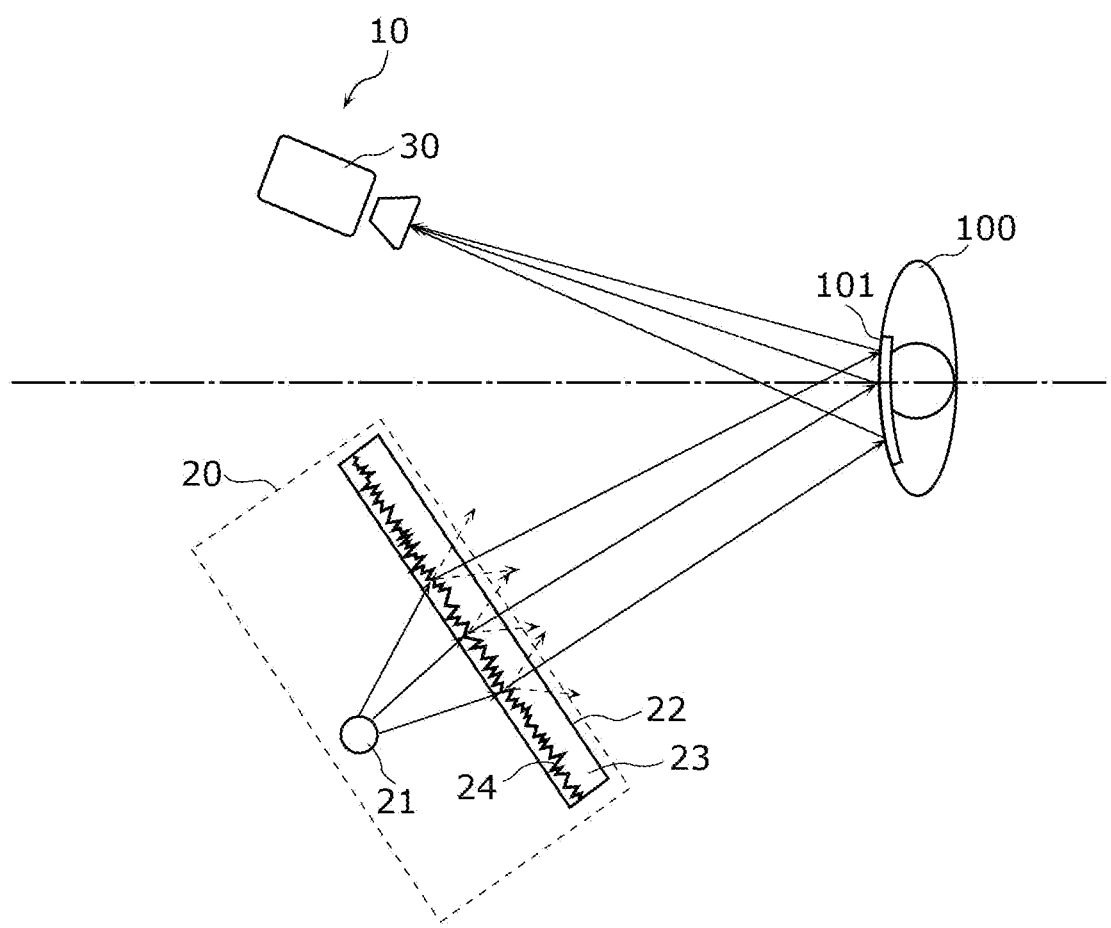
FIG. 5 is a schematic diagram illustrating a cross section showing how a detector according to Embodiment 1 receives reflected waves.

FIG. 5 is a schematic diagram illustrating a cross section showing how light source 20 functions as an area light source that emits sub-terahertz waves and how detector 30 to be described later receives reflected waves generated by a measurement target.

As illustrated in FIG. 5, optical element 23 includes diffuser 24 and has a principal surface on its front side as emission surface 22.

Diffuser 24 diffusely transmits the sub-terahertz waves emitted from point light source 21, to generate sub-terahertz waves to be emitted from emission surface 22. Diffuser 24 is a flat plate that is parallel to emission surface 22 when viewed from a macro perspective. When viewed from a micro perspective, on the other hand, tiny bumps are formed on the entire surface of diffuser 24 so that sub-terahertz waves diffuse when transmitting through diffuser 24.

In light source 20, point light source 21 is disposed at the rear side of optical element 23, as illustrated in FIG. 5. The sub-terahertz waves emitted from point light source 21 enter optical element 23 from the principal surface on the rear side of optical element 23 to reach diffuser 24. The sub-terahertz waves that have reached diffuser 24 diffusely transmit through diffuser 24. The sub-terahertz waves that have diffusely transmitted through diffuser 24 then propagate to emission surface 22 and are emitted outward from emission surface 22.

Referring back to FIG. 3, the description of imaging device 10 continues.

Detector 30 includes image sensor 31.

Image sensor 31 transforms an image generated by sub-terahertz waves emitted from a subject into an electric signal that is in accordance with the intensity of the sub-terahertz waves. Image sensor 31 then generates an image that is based on the electric signal into which the sub-terahertz waves are transformed. Hereinafter, generating, by image sensor 31, an image including an image of a subject is also referred to as "imaging". When sub-terahertz waves emitted from light source 20 are reflected by a measurement target (person 100 in this case) which is a subject and the reflected waves reach image sensor 31, image sensor 31 receives the reflected waves.

As described above, sub-terahertz waves specularly reflect off a human body, a metal, or the like. Therefore, image sensor 31 receives reflected waves from an area, of the body of person 100 and the knife hidden by person 100, which is defined by an angle at which reflected waves resulting from the specular reflection are incident on image sensor 31. Image sensor 31 then detects the intensity of the reflected waves received.

As described above, light source 20 functions as an area light source that emits sub-terahertz waves from emission surface 22. Therefore, light source 20 can irradiate person 100 with sub-terahertz waves from various angles. Image sensor 31 can thus receive reflected waves from area 101 that is a relatively wide range of the surfaces of person 100, i.e., the body of person 100, and a knife hidden by person 100. Accordingly, imaging device 10 is capable of imaging area 101 that is a relatively wide range of the surfaces of the body of person 100 and the knife hidden by person 100.

Figure 6:
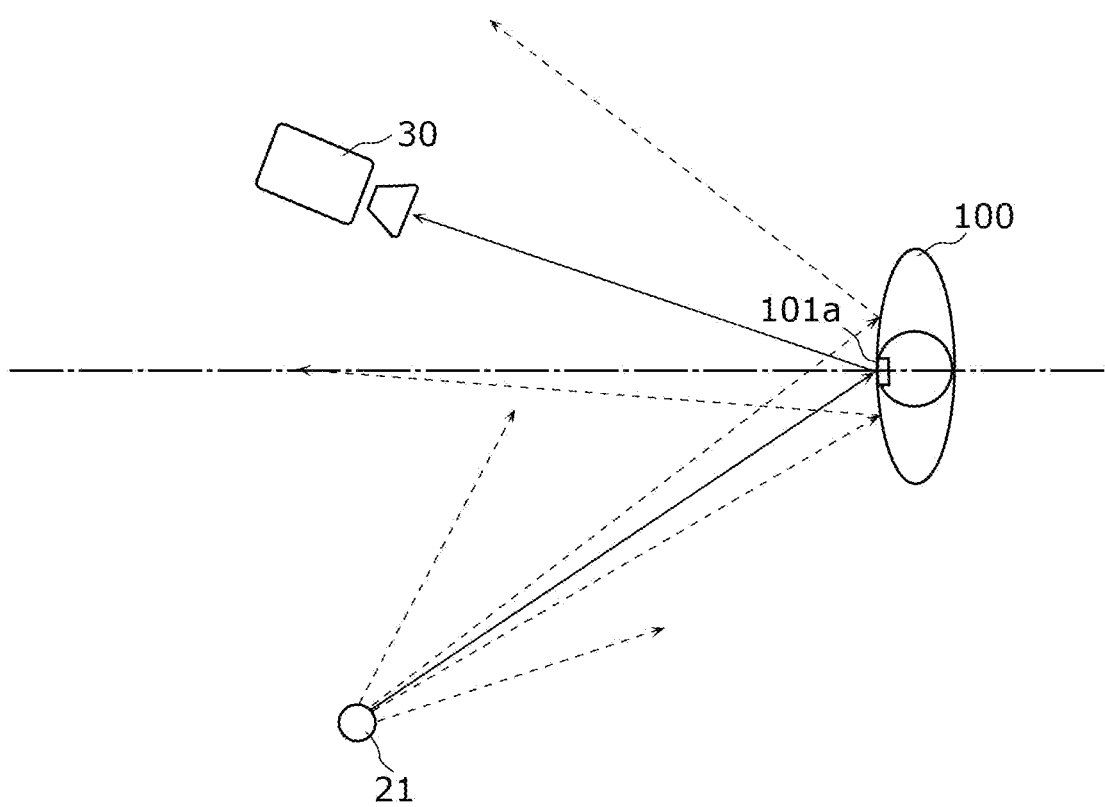
FIG. 6 is a schematic diagram illustrating a cross section showing how a detector according to a first comparative example receives reflected waves.

FIG. 6 is a schematic diagram illustrating a cross section showing how detector 30 receives reflected waves in an imaging device according to a first comparative example, from which optical element 23 has been removed, that is, an imaging device configured to emit sub-terahertz waves emitted outward from point light source 21, as-is.

With the imaging device according to the first comparative example, image sensor 31 can receive only reflected waves from area 101a, of the surfaces of the body of person 100 and the knife hidden by person 100, which is defined by an angle at which reflected waves resulting from specular reflection are incident on image sensor 31, as illustrated in FIG. 6. Accordingly, the imaging device according to the first comparative example can image only area 101a that is a relatively narrow area of the surfaces of the body of person 100 and the knife hidden by person 100.

Thus, imaging device 10 according to Embodiment 1 is capable of more accurately imaging the shapes of the body of person 100 and the knife hidden by person 100, compared to the imaging device according to the first comparative example.

Referring back to FIG. 3, the description of imaging device 10 continues. Detector 30 outputs an image generated by image sensor 31 to image processing unit 40.

Upon receiving the image from detector 30, image processing unit 40 outputs the received image to an external device and also performs image processing on the received image and outputs the result of the image processing to the external device.

The image processing performed by image processing unit 40 may be, for example, a process of determining whether an image outputted from detector 30 includes an object having predetermined characteristics (e.g., an object having the characteristics of a knife) and outputting a predetermined detection signal (e.g., an alarm indicating that an object having the characteristics of a knife is imaged) when it is determined that the image includes an object having the predetermined characteristics. Image processing unit 40 may include, for example, a processor and memory, and perform the process by the processor executing a program stored in the memory.

Imaging device 10 having the above configuration is installed, for example, in a pathway at an airport, in the vicinity of an exit of a station, or the like.

Figure 7:
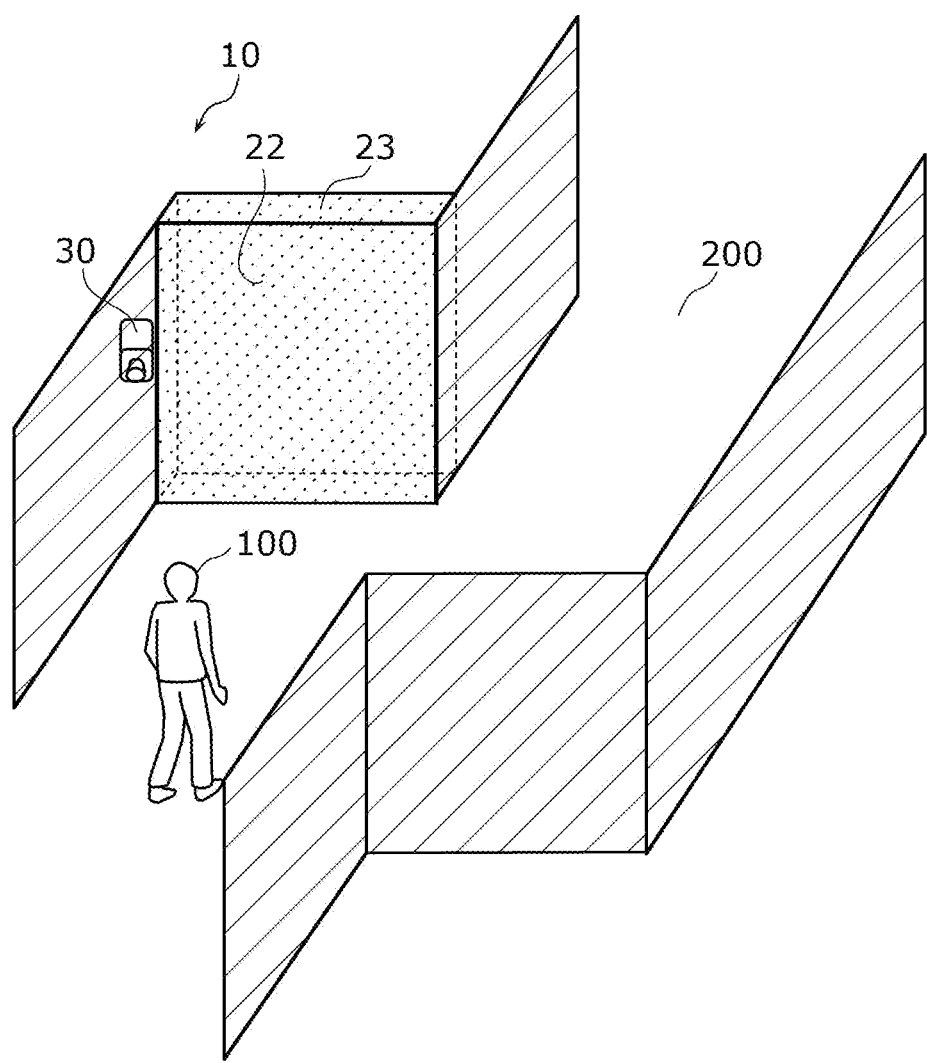
FIG. 7 is a schematic diagram illustrating how the imaging device according to Embodiment 1 is installed.

FIG. 7 is a schematic diagram illustrating how imaging device 10 is installed in a pathway at an airport.

Imaging device 10 may be installed in such a manner, for example, that optical element 23 and detector 30 are embedded inside a wall along pathway 200 that is in a crank shape at an airport, as illustrated in FIG. 7.

In FIG. 7, sub-terahertz waves emitted from emission surface 22 inside the wall transmit through the wall and person 100 is irradiated with the sub-terahertz waves. Then, reflected waves generated by person 100 reflecting the sub-terahertz waves transmit through the wall again to be incident on detector 30. This enables imaging device 10 to image a hazardous object such as a knife hidden under the clothes or the like of person 100 walking along pathway 200.

Embodiment 2

The following describes an imaging device according to Embodiment 2 which has a configuration obtained by partly modifying the configuration of imaging device 10 according to Embodiment 1. Hereinafter, the imaging device according to Embodiment 2 will be described mainly focusing on the difference between the imaging device according to Embodiment 2 and imaging device 10.

Figure 8:
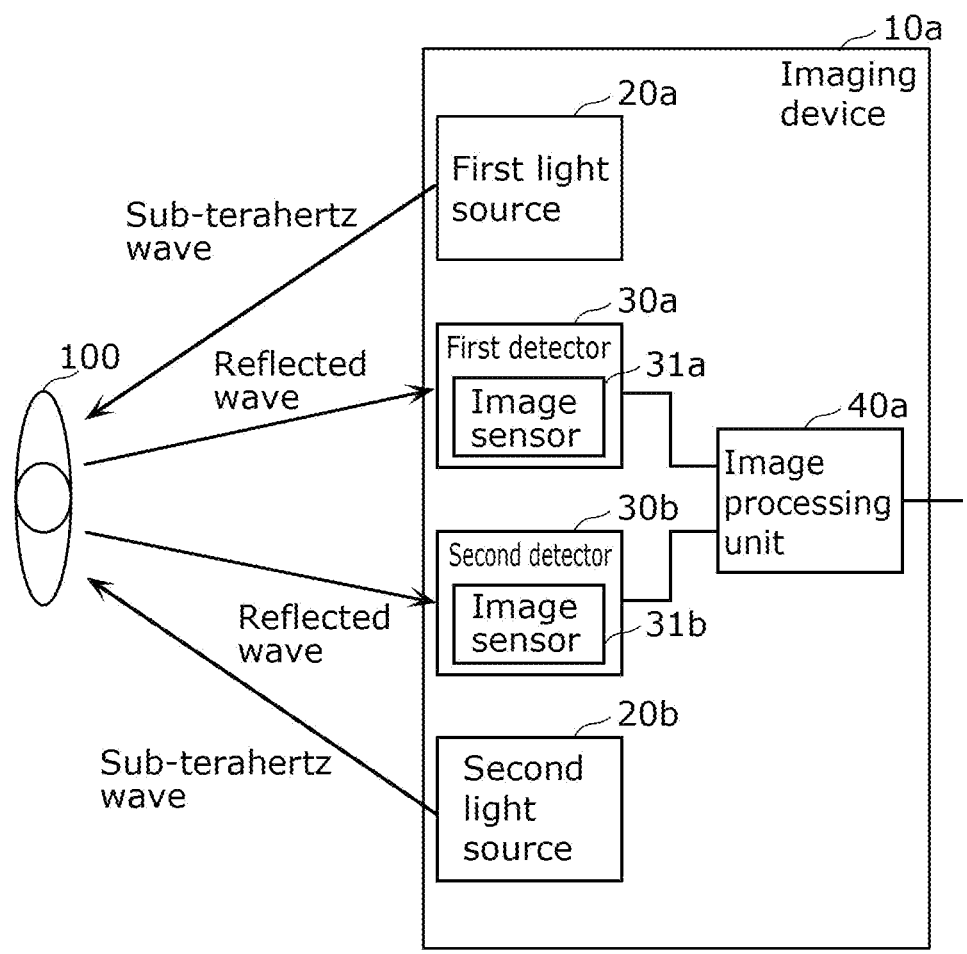
FIG. 8 is a block diagram illustrating a configuration of an imaging device according to Embodiment 2.

FIG. 8 is a block diagram illustrating a configuration of imaging device 10a according to Embodiment 2.

As illustrated in FIG. 8, imaging device 10a includes first light source 20a and second light source 20b as modified from light source 20 of imaging device 10 according to Embodiment 1, first detector 30a and second detector 30b as modified from detector 30 of imaging device 10, and image processing unit 40a as modified from image processing unit 40 of imaging device 10.

First light source 20a emits sub-terahertz waves to a measurement target (person 100 in this case).

Figure 9:
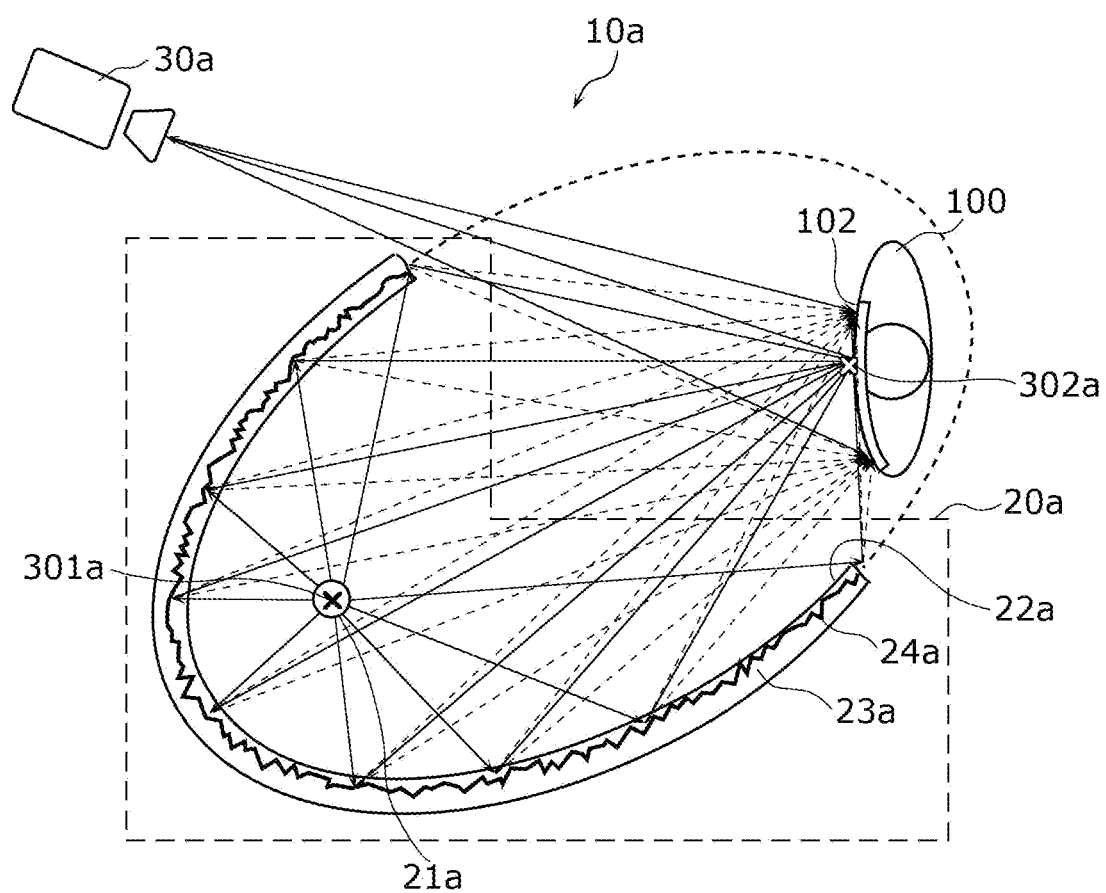
FIG. 9 is a schematic diagram illustrating a cross section showing how a detector according to Embodiment 2 receives reflected waves.

FIG. 9 is a schematic diagram illustrating a configuration of first light source 20a as well as a cross section showing how first light source 20a functions as an area light source and how first detector 30a to be described later receives reflected waves.

As illustrated in FIG. 9, first light source 20a includes point light source 21a and optical element 23a.

Point light source 21a emits sub-terahertz waves radially in all directions in the vicinity of point light source 21a.

Optical element 23a has first emission surface 22a and generates, from the sub-terahertz waves emitted from point light source 21a, sub-terahertz waves to be emitted from first emission surface 22a. First emission surface 22a here is the inner surface of a spheroid. Therefore, optical element 23a functions as an area light source that emits sub-terahertz waves from first emission surface 22a which is the inner surface of a spheroid.

As illustrated in FIG. 9, optical element 23a includes reflector 24a and has first emission surface 22a as the inner curved surface of reflector 24a.

Reflector 24a diffusely reflects sub-terahertz waves emitted from point light source 21a to generate sub-terahertz waves to be emitted from first emission surface 22a. When viewed from a macro perspective, reflector 24a has the same or larger size but is similar in shape compared to first emission surface 22a, and two focal points of reflector 24 match two focal points of first emission surface 22a. When viewed from a micro perspective, on the other hand, tiny bumps are formed on the entire surface of the reflection surface of reflector 24a so that the reflected sub-terahertz waves diffuse.

In first light source 20a, point light source 21a is disposed at one focal point 301a of the two focal points of first emission surface 22a, as illustrated in FIG. 9. The sub-terahertz waves emitted from point light source 21a enter optical element 23a from first emission surface 22a and reaches reflector 24a. The sub-terahertz waves that have reached reflector 24a are diffusely reflected by reflector 24a. The sub-terahertz waves that have diffusely reflected by reflector 24a are then transmitted to first emission surface 22a and emitted outward from first emission surface 22a. For example, person 100 in the vicinity of other focal point 302a of the two focal points of first emission surface 22a is irradiated with the sub-terahertz waves emitted outward.

Second light source 20b in FIG. 8 has the same function as that of first light source 20a, and has a shape that is in a mirrored relationship with the shape of first light source 20a. Therefore, second light source 20b can be explained by replacing point light source 21a with point light source 21b, optical element 23a with optical element 23b, reflector 24a with reflector 24b, one focal point 301a with one focal point 301b, and other focal point 302a with other focal point 302b in the description of first light source 20a, while keeping the description on the shape of second light source 20b unchanged.

Referring back to FIG. 8, the description of imaging device 10a continues.

First detector 30a includes first image sensor 31a. First detector 30a is the same as detector 30 according to Embodiment 1. In other words, first image sensor 31a is the same as image sensor 31 according to Embodiment 1.

Second detector 30b is the same as first detector 30a. Therefore, second detector 30b can be explained by replacing first image sensor 31a with second image sensor 31b in the description of first detector 30a.

As described above, first light source 20a functions as an area light source that emits sub-terahertz waves from first emission surface 22a. First light source 20a is therefore capable of irradiating person 100 in the vicinity of other focal point 302a with sub-terahertz waves from various angles. First image sensor 31a can thus receive reflected waves from area 102 that is a relatively wide range of the surfaces of person 100, that is, the body of person 100 and a knife hidden by person 100. Accordingly, imaging device 10a is capable of imaging area 102 that is a relatively wide range of the surfaces of the body of person 100 and the knife hidden by person 100.

Figure 10:
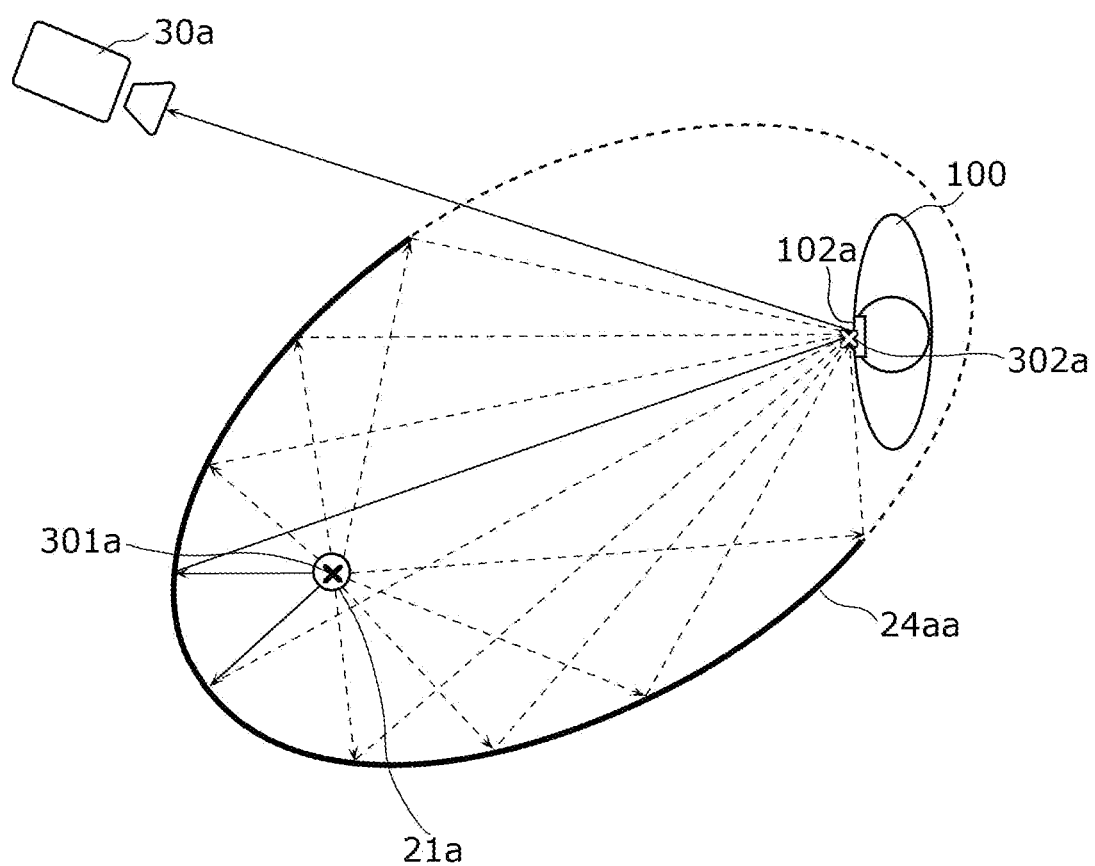
FIG. 10 is a schematic diagram illustrating a cross section showing how a detector according to a second comparative example receives reflected waves.

FIG. 10 is a schematic diagram illustrating a cross section showing how first detector 30a receives reflected waves in an imaging device according to a second comparative example which has a configuration in which reflector 24a of imaging device 10a is modified to reflector 24aa. When viewed from a macro perspective, reflector 24aa here has the same shape as reflector 24a, but when viewed from a micro perspective, the entire surface of the reflection surface of reflector 24aa is smoothly formed so that reflected sub-terahertz waves specularly reflect off the reflection surface. Therefore, sub-terahertz waves emitted from one focal point 301a and reflected by reflector 24aa all travel toward other focal point 302a no matter which portion of reflector 24aa the reflected sub-terahertz waves have been reflected. Therefore, in the imaging device according to the second comparative example, image sensor 31a can receive only reflected waves from area 102a, which is located at other focal point 302a, of the surfaces of the body of person 100 in the vicinity of other focal point 302a and the knife hidden under the clothes of person 100, as illustrated in FIG. 10. Accordingly, the imaging device according to the second comparative example can image only area 102a that is a relatively narrow area of the surfaces of the body of person 100 and the knife hidden by person 100.

Thus, imaging device 10a according to Embodiment 2 is capable of more accurately imaging the shapes of the body of person 100 and the knife hidden by person 100, as compared to the imaging device according to the second comparative example.

Referring back to FIG. 8, the description of imaging device 10a continues.

First detector 30a and second detector 30b respectively output a first image and a second image respectively generated by first image sensor 31a and second image sensor 31b to image processing unit 40a.

Upon receiving the first image and the second image from first detector 30a and second detector 30b, respectively, image processing unit 40a outputs the received first image and second image to an external device, and also performs image processing on the received first image and second image and outputs the result of the image processing to the external device.

The image processing performed by image processing unit 40a may be, for example, determining whether the first image and the second image respectively outputted from first detector 30a and second detector 30b each include an object having predetermined characteristics (e.g., an object having the characteristics of a knife), and outputting a predetermined detection signal (e.g., an alarm indicating that an object having the characteristics of a knife is imaged) when it is determined that at least one of the first image or the second image includes an object having predetermined characteristics. The image processing performed by image processing unit 40a may also include a process of: blending the first image and the second image in a lighten only mode to generate a blended image in the case where it is determined that at least one of the first image or the second image includes an object having the predetermined characteristics; determining whether the blended image includes an object having the predetermined characteristics; and in the case where it is determined that the blended image includes an object having the predetermined characteristics, outputting a predetermined detection signal. Image processing unit 40a may include, for example, a processor and memory, and perform the process by the processor executing a program stored in the memory.

Imaging device 10a having the above configuration is installed, for example, in a pathway at an airport or in the vicinity of an exit of a station.

Figure 11:
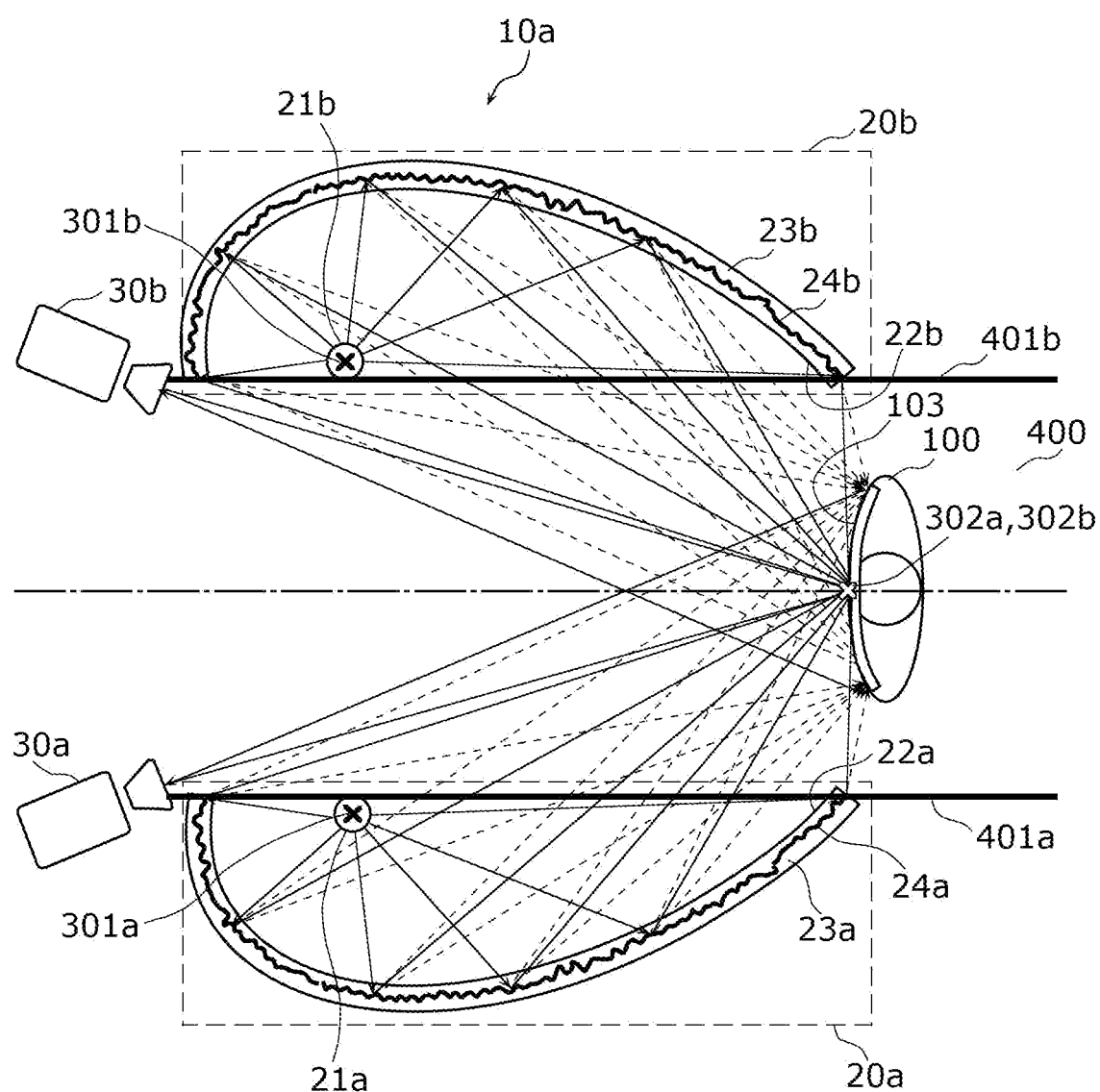
FIG. 11 is a schematic diagram illustrating a cross section showing how the imaging device according to Embodiment 2 is installed.

FIG. 11 is a schematic diagram illustrating a cross section showing how imaging device 10a is installed in a pathway in the vicinity of an exit of a station.

Imaging device 10a may be installed in such a manner, for example, that optical element 23a and optical element 23b are embedded inside walls along pathway 400 in the vicinity of an exit of a station, as illustrated in FIG. 11. More specifically, imaging device 10a may be installed in such a manner, for example, that optical element 23a is embedded inside wall 401a that is one of the side walls along pathway 400 and optical element 23b is embedded inside wall 401b that is the other of the side walls along pathway 400. Thus, imaging device 10a may be installed in such a manner that first light source 20a and second light source 20b are provided on opposite sides of pathway 400 and first detector 30a and second detector 30b are also provided on opposite sides of pathway 400. Accordingly, first detector 30a detects, using first image sensor 31a, the intensities of reflected waves generated by a measurement target (person 100 in this case) positioned in pathway 400 reflecting sub-terahertz waves emitted from first emission surface 22a and sub-terahertz waves emitted from second emission surface 22b, whereas second detector 30b detects, using second image sensor 31b, the intensities of reflected waves generated by a measurement target (person 100 in this case) positioned in pathway 400 reflecting sub-terahertz waves emitted from first emission surface 22a and sub-terahertz waves emitted from second emission surface 22b. In this case, it is desirable that optical element 23a and optical element 23b be installed so that other focal point 302a of optical element 23a substantially coincides with other focal point 302b of optical element 23b on the center line of pathway 400. By thus placing optical elements 23a and 23b, it is possible to irradiate an area in the vicinity of other focal point 302a or other focal point 302b (hereinafter referred to as "focal area") with sub-terahertz waves emitted from point light source 21a and sub-terahertz waves emitted from point light source 21b from various angles. Therefore, first image sensor 31a and second image sensor 31b respectively included in first detector 30a and second detector 30b can receive reflected waves from area 103 that is a relatively wide range of the surface of person 100 walking in the focal area, that is, the body of person 100 walking in a focal area and the surface of the knife hidden by person 100, as illustrated in FIG. 11. Accordingly, imaging device 10*a* is capable of imaging area 103 that is a relatively wide range of the surfaces of the body of person 100 and the knife hidden by person 100. Moreover, first image sensor 31*a* and second image sensor 31*b* respectively included in first detector 30*a* and second detector 30*b* receive reflected waves from mutually different angles from area 103. Accordingly, imaging device 10*a* is capable of imaging the body of person 100 and the knife hidden by person 100, which are the same subject, from mutually different angles.

Hereinafter, an operation performed by imaging device 10*a* having the above configuration will be described.

As one example, imaging device 10*a* performs an image analysis process. The image analysis process is a process in which imaging device 10*a* images a first image and a second image and outputs, based on the imaged first image and second image, a detection signal which is an alarm indicating that an object having the characteristics of a knife is being imaged.

Figure 12:
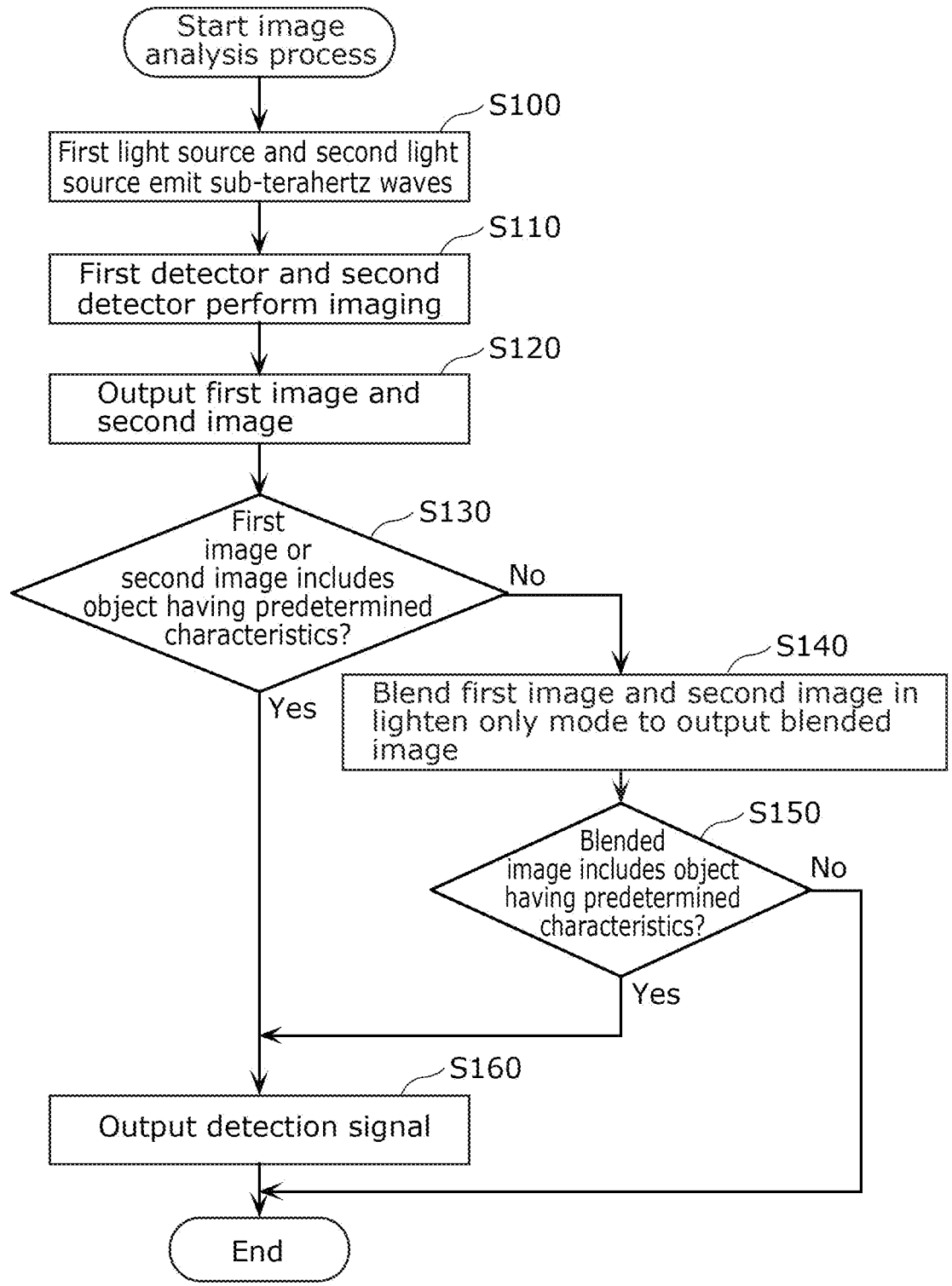
FIG. 12 is a flowchart illustrating an image analysis process.

FIG. 12 is a flowchart illustrating the image analysis process performed by imaging device 10*a*.

The image analysis process is started when a person enters a focal area.

When a person enters a focal area, imaging device 10*a* detects that the person has entered the focal area. Imaging device 10*a* may detect that a person has entered the focal area, for example, by receiving a signal indicating that the person has entered the focal area from an external sensor that detects a person entering the focal area.

When it is detected that the person has entered the focal area, first light source 20*a* and second light source 20*b* emit sub-terahertz waves at the same timing in synchronization with each other (step S100). Moreover, first detector 30*a* and second detector 30*b* image the person having entered the focal area at the timing when first light source 20*a* and second light source 20*b* emit the sub-terahertz waves in synchronization with each other (step S110). First detector 30*a* and second detector 30*b* then respectively output a first image and a second image to image processing unit 40*a*.

When the first image and the second image are output, image processing unit 40*a* receives the first image and the second image that have been output and outputs the received first image and second image to an external device (step S120). Image processing unit 40*a* then determines whether at least one of the first image or the second image includes an object having the characteristics of a knife which are predetermined characteristics (step S130).

In the process of step S130, in the case of not determining that at least one of the first image or the second image includes an object having the predetermined characteristics (step S130: No), image processing unit 40*a* blends the first image and the second image in a lighten only mode to generate a blended image, and outputs the generated blended image (step S140). Image processing unit 40*a* then determines whether the generated blended image includes an object having the characteristics of a knife which are the predetermined characteristics (step S150).

In the case of determining that at least one of the first image or the second image includes an object having the predetermined characteristics (step S130: Yes) in the process of step S130 and also in the case of determining that the blended image includes an object having the predetermined characteristics (step S150: Yes) in the process of step S150, image processing unit 40*a* outputs, to an external device, a detection signal which is an alarm indicating that an object having the characteristics of a knife is being imaged (step S160).

Imaging device 10*a* ends the image analysis process when the process of step S160 ends or in the case of not determining that the blended image includes an object including the predetermined characteristics (step S150: No) in the process of step S150.

Other Embodiments

As described above, the imaging device according to an aspect of the present disclosure has been described based on Embodiment 1 or Embodiment 2, but the present disclosure is not limited to these embodiments. Various modifications to the embodiments which may be conceived by those skilled in the art, as well as embodiments resulting from arbitrary combinations of elements from different embodiments may be included within the scope of one or more aspects of the present disclosure so long as they do not depart from the essence of the present disclosure.

(1) Embodiment 2 has described that imaging device 10*a* includes: first light source 20*a* including optical element 23*a* having first emission surface 22*a* which is the inner surface of a spheroid; and second light source 20*b* including optical element 23*b* having second emission surface 22*b* which is the inner surface of a spheroid. In contrast, an imaging device according to a variation that is another example of an aspect of the present disclosure may include: instead of optical element 23*a*, a first light source according to the variation which includes first emission surface 22*a* whose shape has been changed from the inner surface of a spheroid to the inner surface of part of a sphere; and instead of optical element 23*b*, a second light source according to the variation which includes second emission surface 22*b* whose shape has been changed from the inner surface of a spheroid to the inner surface of part of a sphere, as modified from imaging device 10*a* according to Embodiment 2.

Figure 13:
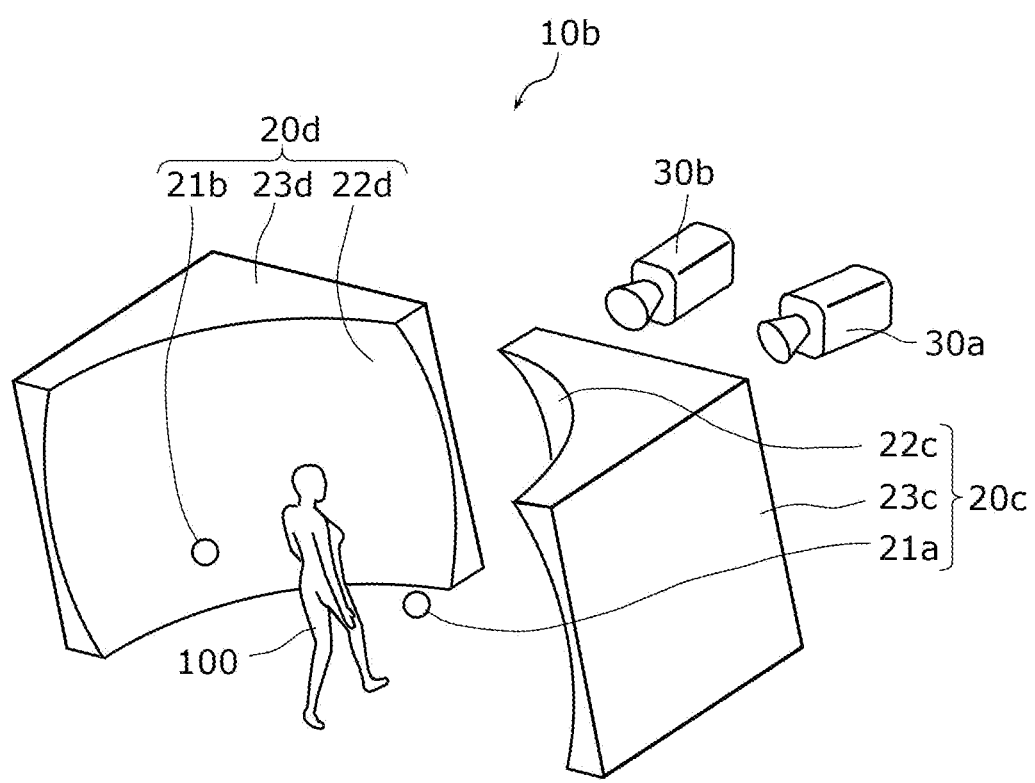
FIG. 13 is a schematic diagram illustrating part of an outer appearance of an imaging device according to a variation.

FIG. 13 is a schematic diagram illustrating part of an outer appearance of the imaging device according to the variation.

In imaging device 10*b* according to the variation, first light source 20*c* according to the variation includes point light source 21*a* and optical element 23*c* having first emission surface 22*c* which is the inner surface of part of a sphere, as illustrated in FIG. 13. Point light source 21*a* is disposed in the vicinity of the center of the sphere. Second light source 20*d* according to the variation includes point light source 21*b* and optical element 23*d* having second emission surface 22*d* which is the inner surface of part of the sphere. Point light source 21*b* is disposed in the vicinity of the center of the sphere.

(2) Embodiment 1 has described that optical element 23 includes diffuser 24. In contrast, optical element 23 may be diffuser 24 per se, as another example. In this case, the surface of diffuser 24 is emission surface 22.

(3) Embodiment 2 has described that optical element 23*a* and optical element 23*b* include reflector 24*a* and reflector 24*b*, respectively. In contrast, optical element 23*a* and optical element 23*b* may be reflector 24*a* per se and reflector 24*b* per se, respectively. In this case, the reflection surface of reflector 24*a* and the reflection surface of reflector 24*b* are first emission surface 22*a* and second emission surface 22*b*, respectively.

(4) Embodiment 1 has described that light source 20 includes one point light source 21. However, the number of point light sources included in light source 20 does not need to be limited to one and may be plural. In this case, optical element 23 generates, from sub-terahertz waves emitted from a plurality of point light sources, sub-terahertz waves to be emitted from emission surface 22.

(5) Embodiment 2 has described that first light source 20a and second light source 20b respectively include one point light source 21a and one point light source 21b. However, the number of point light sources included in first light source 20a or second light source 20b does not need to be limited to one and may be plural. In this case, optical element 23a and optical element 23b generate, from sub-terahertz waves emitted from a plurality of point light sources, sub-terahertz waves to be emitted from first emission surface 22a and sub-terahertz waves to be emitted from second emission surface 22b, respectively.

(6) An aspect of the present disclosure may be not only the imaging device according to Embodiment 1 or Embodiment 2, but also an imaging method implementing steps performed by characteristic components included in the imaging device. In addition, an aspect of the present disclosure may be a program causing a computer to execute each of the characteristic steps included in the imaging method. Moreover, an aspect of the present disclosure may be a non-transitory computer-readable recording medium having such a program recorded thereon.

INDUSTRIAL APPLICABILITY

The present disclosure can be widely used for imaging devices that image objects.

The invention claimed is:

1. An imaging device comprising:
a first light source including a first emission surface from which a sub-terahertz wave is emitted to a measurement target; and
a first detector including a first image sensor that detects an intensity of a reflected wave generated by the measurement target specularly reflecting the sub-terahertz wave emitted from the first emission surface, wherein
the first light source includes:
at least one point light source that emits a sub-terahertz wave; and
an optical element serving as an area light source that emits a sub-terahertz wave from the first emission surface by diffusing, at a micro level, the sub-terahertz wave emitted from the at least one point light source, and that illuminates a same measurement position on the measurement target with the sub-terahertz wave from various angles,
the imaging device further comprises:
a second light source including a second emission surface from which a sub-terahertz wave is emitted to the measurement target, the second emission surface being located at a position different from a position of the first emission surface; and
a second detector including a second image sensor that detects an intensity of a reflected wave generated by the measurement target specularly reflecting the sub-terahertz wave emitted from the first emission surface and the sub-terahertz wave emitted from the second emission surface and the sub-terahertz wave emitted from the second emission surface,
the first emission surface emits the sub-terahertz wave from a first direction and the second emission surface emits the sub-terahertz wave from a second direction different from the first direction, and
the first detector receives, from the first direction, the reflected wave generated by the measurement target specularly reflecting the sub-terahertz wave, and the second detector receives, from the second direction, the reflected wave generated by the measurement target specularly reflecting the sub-terahertz wave.

2. The imaging device according to claim 1, wherein
the optical element has bumps formed in an area that the sub-terahertz wave emitted from the at least one point light source reaches on a surface parallel to the first emission surface, and
the sub-terahertz wave emitted from the at least one point light source is diffused, at a micro level, by the bumps in the area that the sub-terahertz wave reaches, to illuminate a same measurement position on the measurement target with the sub-terahertz wave from various angles.

3. The imaging device according to claim 1, wherein
the optical element includes a reflector that diffusely reflects the sub-terahertz wave emitted from the at least one point light source, to generate a sub-terahertz wave to be emitted from the first emission surface.

4. The imaging device according to claim 1, wherein
the optical element includes a diffuser that diffusely transmits the sub-terahertz wave emitted from the at least one point light source, to generate a sub-terahertz wave to be emitted from the first emission surface.

5. The imaging device according to claim 1, wherein
the first emission surface is a curved surface.

6. The imaging device according to claim 5, wherein
the curved surface includes part of an inner surface of a spheroid.

7. The imaging device according to claim 6, wherein
the spheroid is a sphere.

8. The imaging device according to claim 1, wherein
the first emission surface includes part of an inner surface of a first spheroid,
the first light source is disposed at one of two focal points of the first spheroid, and an other of the two focal points is a measurement position of the measurement target,
the second emission surface includes part of an inner surface of a second spheroid, and
the second light source is disposed at one of two focal points of the second spheroid, and an other of the two focal points is at a same position as the other of the two focal points of the first spheroid and is the measurement position of the measurement target.

9. The imaging device according to claim 1, wherein
the first image sensor outputs a first image that is based on the intensity of the sub-terahertz wave detected,
the second image sensor outputs a second image that is based on the intensity of the sub-terahertz wave detected, and
the imaging device further comprises:
an image processing unit configured to blend the first image and the second image in a lighten only mode to generate a blended image, and output the blended image generated.

10. The imaging device according to claim 9, wherein
the image processing unit is configured to determine whether at least one of the first image or the second image includes an object having a predetermined characteristic;
when it is determined that the at least one of the first image or the second image includes an object having the predetermined characteristic, the image processing unit is configured to output a predetermined first detection signal;

when it is determined that the at least one of the first image or the second image does not include an object having the predetermined characteristic, the image processing unit is configured to generate the blended image and further determine whether the blended image includes an object having the predetermined characteristic; and when it is determined that the blended image includes an object having the predetermined characteristic, the image processing unit is configured to output a predetermined second detection signal.

11. The imaging device according to claim 1, wherein the first light source and the second light source are provided on opposite sides of a pathway, the first detector and the second detector are provided on opposite sides of the pathway, the first detector detects, using the first image sensor, intensities of reflected waves generated by the measurement target positioned in the pathway specularly reflecting the sub-terahertz wave emitted from the first emission surface and the sub-terahertz wave emitted from the second emission surface, and the second detector detects, using the second image sensor, intensities of reflected waves generated by the measurement target positioned in the pathway specularly reflecting the sub-terahertz wave emitted from the first emission surface and the sub-terahertz wave emitted from the second emission surface.

12. The imaging device according to claim 1, wherein the sub-terahertz wave is an electromagnetic wave having a frequency that ranges from 0.08 THz to 1 THz, inclusive.

* * * * *